US005216916A

United States Patent [19]

Bederna et al.

[11] Patent Number: 5,216,916

[45] Date of Patent: Jun. 8, 1993

[54] ELECTRONIC ENGINE POWER CONTROL SYSTEM FOR A MOTOR VEHICLE

[75] Inventors: Frank Bederna, Markgröningen; Bernd Lieberoth-Leden, Leonberg; Dieter Sorg, Gemmingen, all of Fed. Rep. of Germany

[73] Assignee: Robert Bosch GmbH, Stuttgart, Fed. Rep. of Germany

[21] Appl. No.: 801,675

[22] Filed: Dec. 2, 1991

[30] Foreign Application Priority Data

Nov. 30, 1990 [DE] Fed. Rep. of Germany ....... 4038227

[51] Int. Cl.[5] ........................................ G01M 15/00

[52] U.S. Cl. ................................................ 73/118.1

[58] Field of Search .............. 73/118.1; 123/361, 399, 123/479

[56] References Cited

U.S. PATENT DOCUMENTS

| | | | |
|---|---|---|---|
| 4,644,570 | 2/1987 | Brosh et al. | 377/17 |
| 4,718,272 | 1/1988 | Plapp | 73/118.1 |
| 4,919,097 | 4/1990 | Mitui et al. | 123/361 X |

FOREIGN PATENT DOCUMENTS

WO86/04731 8/1986 World Int. Prop. O. .

OTHER PUBLICATIONS

"Elektronische Motorsteuerung für Kraftfahrzeuge" by G. Kolberg, Motortechnische Zeitschrift, 46th year, vol. 4, 1985.

"Methoden der Feinpositionierung von Schrittmotoren im Bereich eines Schritts" by U. Walosczyk, Elektrie 28, vol. 4, pp. 191 to 193, 1974.

*Primary Examiner*—Jerry W. Myracle

*Attorney, Agent, or Firm*—Walter Ottesen

[57] ABSTRACT

An electronic engine power control system is disclosed for a motor vehicle wherein a measuring arrangement is utilized for determining the position of an actuating element. The measuring arrangement is configured in such a manner that it has different resolutions in various ranges of the position of the actuating element. The open-loop or closed-loop control of the position of the engine power-determining element or of the actuating element in idle or near idle is undertaken in dependence upon the measurement signal of high resolution while, outside of the idle or near idle range, the control of the actuating element is undertaken in dependence upon measurement signals of low resolution or a straight open-loop control of the position of the actuating element.

8 Claims, 4 Drawing Sheets

ELECTRONIC ENGINE POWER CONTROL SYSTEM FOR A MOTOR VEHICLE

BACKGROUND OF THE INVENTION

An electronic engine control arrangement for a motor vehicle is disclosed in the publication entitled "Elektronische Motorsteuerung für Kraftfahrzeuge", Motortechnische Zeitschrift, 46th year, Volume 4, 1985. A measuring unit configured as a potentiometer transmits the position of an operator-controlled element actuable by the driver to an open-loop/closed-loop control unit. The control unit forms a desired value for a position control of the power-determining element of the engine from the position signal of the operator-controlled element and possibly from further operating variables of the engine and/or the vehicle. A controller compares the desired value formed in this manner to an actual value of the position of the power-determining element or of the electrically actuable positioning motor connected to this power-determining element with the actual value being detected by a further measuring unit. The control output signal actuates the positioning motor in the sense of a control of the desired value to the actual value.

This control takes place during operation of the motor vehicle, that is, when the accelerator pedal is actuated as well as during the idle operating condition of the engine. What is different from the above-described vehicle operation is that in the idle operating condition, the desired value for the position control of the power-determining element is determined in dependence upon operating variables of the engine and/or of the motor vehicle with a view to a pregiven desired engine speed.

Since for this control of the idle engine speed in the idle operating condition of the engine and in contrast to the straight position control, a higher precision is required of the position control and its components, a measuring unit having a very high resolution capacity with respect to the position of the element over its entire range of movement is provided for detecting the position of the power-determining element. Analog components and components of the open-loop/closed-loop control unit having high resolution are connected with the foregoing especially analog-to-digital converters converting the analog position signal into digital values. Components of this kind have a very high resolution over the entire range of movement of the power-determining element or of the actuating element and are, as a rule, complex and expensive as are the analog components.

Furthermore, these measuring units and components must satisfy the strict requirements for utilization in motor vehicles with respect to tolerance, resistance to temperature, sensitivity to contaminants, availability and operational reliability. These factors increase additionally the cost and complexity.

SUMMARY OF THE INVENTION

In view of the foregoing, it is an object of the invention to reduce the complexity and cost of an electronic engine control arrangement without affecting the functional capability and operational reliability of the system.

This object is achieved with the measures with respect to the position measuring arrangements and the preprocessing of the positioning signals. A measuring arrangement is provided which detects the position of the actuating element or of the operator-controlled element and which has different resolution capacities in various position ranges of the particular element. This measuring arrangement can also be comprised of two measuring units which are independent of each other. The measuring arrangement is configured in such a manner that it has a higher resolution in the range of the idle position of the particular element than outside of this range.

The idle operating condition of the engine is as a rule present when the power-determining actuator element is disposed in the range of its idling position. In this idle operating condition of the engine, the position of the actuating element is controlled in dependence upon the pregiven desired value and the positioning actual value of the actuating element detected with a higher-resolution range of the measuring arrangement. Outside of the idle condition, a control of the actuating element takes place in dependence upon the desired value and the actuating element position detected with the less high resolution range of the measuring arrangement or the position of the actuating element is controllably adjusted in dependence upon the position of the operator-controlled element and a desired value derived therefrom in combination with further operating variables. In this case, the measuring arrangement transmits no positioning signal outside of the above-mentioned range and its resolution in this range is therefore zero.

U.S. Pat. No. 4,718,272 discloses a potentiometer for detecting the position of a throttle flap which has various ranges of different resolutions. The potentiometer tracks are shortened with respect to the overall length assigned to the overall range of movement of the throttle flap. With these potentiometer tracks, ranges of higher resolution capacity of the measuring unit are produced, since the voltage drop which is available is then across a smaller range of movement of the throttle flap.

U.S. patent application Ser. No. 700,295, filed Feb. 11, 1985, (corresponding to published International application WO 86/04731) or U.S. Pat. No. 4,644,570 disclose contactless inductive sensors which ratiometrically and absolutely detect the position of the element connected thereto.

The paper of U. Walosczyk entitled "Methoden der Feinpositionierung von Schrittmotoren im Bereich eines Schritts" published in Elektrie 28, Volume 4, pages 191 to 193, 1974, discloses possibilities which enable the position of the step motor to be very precisely adjusted.

SUMMARY OF THE INVENTION

The features of the invention lead to a considerable reduction of the technical complexity and cost for an electronic engine control. By utilizing measuring arrangements with ranges of different resolution with the resolution outside of the idle range of the position of the power-determining element being significantly less than in conventional engine-power controls, the complexity with reference to the measuring units and the components connected thereto is reduced.

The complexity for an engine power control can be further reduced by using a measuring arrangement which includes two different measuring units independent of each other. This reduction in complexity is achieved when the measuring units each only emit one signal for a pregiven position range of the power-determining element. In this case, low cost sensors can be used for the individual measuring units.

Mutual monitoring of the measuring units improves the operational reliability of the controls since these measuring units are at least partially redundant with reference to the position of the element connected thereto.

Forming of absolute position values on the basis of the measurement signals of two measuring units according to the invention permits a further reduction of the complexity by utilizing analog-to-digital converters having lower resolution and/or using a digital controller.

A further advantageous possibility results by doing without a position control of the power-determining element outside of the idle operating condition and the transition to open-loop control using a positionable step motor.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
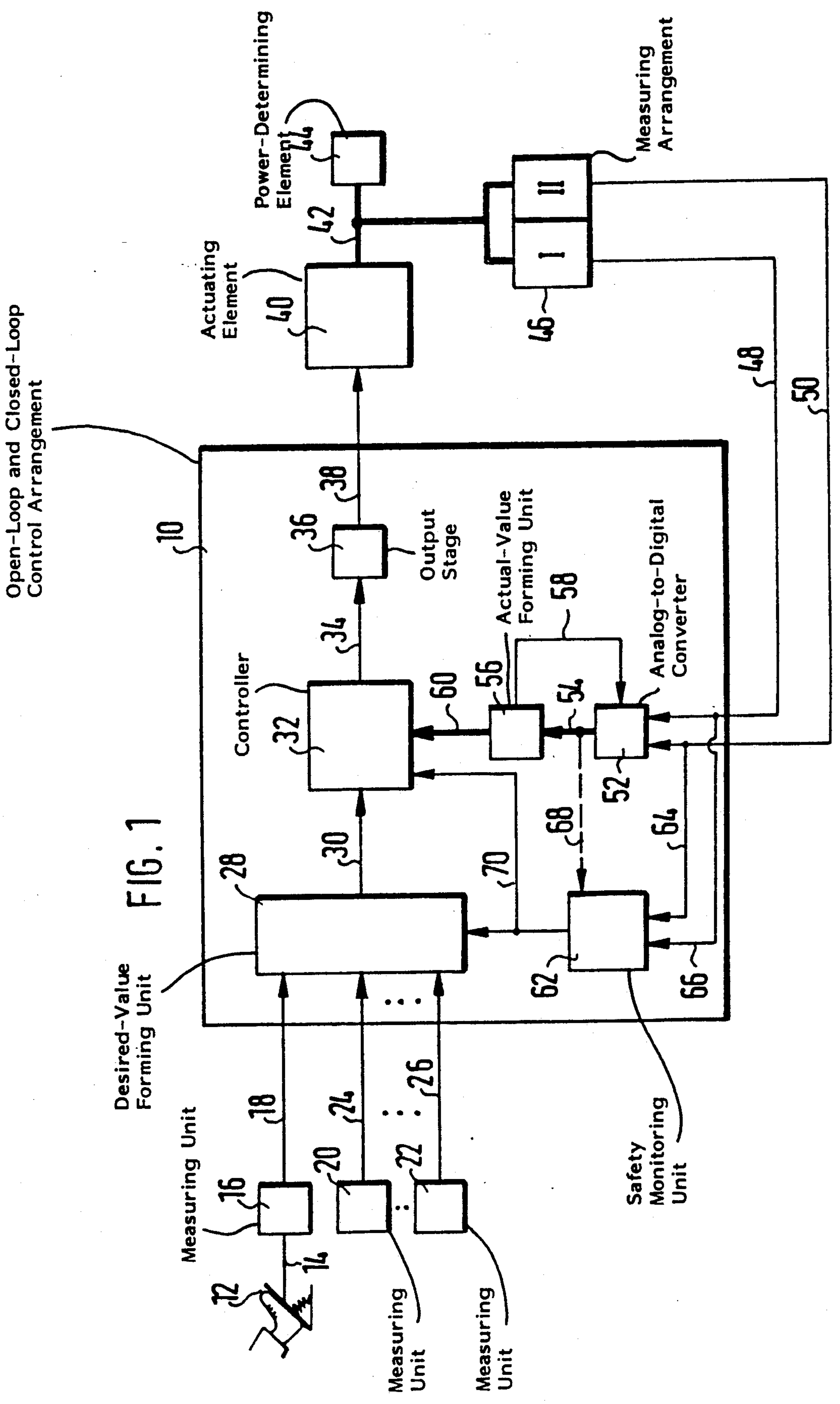
FIG. 1 shows a first embodiment of the electronic engine power control system of the invention in the form of a block diagram showing the invention and wherein a measuring arrangement is utilized.

In FIG. 1, an electronic open-loop/closed-loop control arrangement 10 and an operator-controlled element 12 such as an accelerator pedal actuable by the driver are shown. The operator-controlled element 12 is connected via a mechanical connection 14 to a measuring unit 16 for detecting the position of the accelerator pedal. The output line 18 of this measuring unit 16 is connected to the control arrangement 10. In addition, measuring units 20 to 22 are provided which detect the operating variables of the engine and/or of the motor vehicle which are needed for the electronic engine power control. The measuring units 20 to 22 are connected via lines 24 to 26, respectively, to the control arrangement 10.

The control arrangement 10 includes a desired-value forming unit 28 which includes an analog-to-digital stage (not shown) and to which the connecting lines 18 as well as 24 to 26 are connected. The output line 30 of the forming unit 28 is connected to a controller 32. The output line 34 of the controller 32 is connected via an output stage 36 and the output line 38 of the control arrangement 10 to an electrically actuable actuating element 40. The output stage 36 can include a digital-to-analog converter which is not shown. The actuating element 40 is connected to the power-determining element 44 of the engine via a mechanical connection 42. The power-determining element 44 can be for example a throttle flap or an injection pump of the engine. The actuating element and the mechanical connection 42 or the power-determining element 44 are rigidly connected to a measuring arrangement 46 which detects the position of the actuating element and therefore also the position of the mechanical connection 42 and of the power-determining element 44. The measuring arrangement 46 preferably comprises two measuring units or sensors which are identified in FIG. 1 by reference numerals I and II. Both sensors emit signals which represent the position of the actuating element assembly (40 to 44) with the sensor I emitting a measurement signal only in the range of the idle position of the actuating element assembly whereas the sensor II detects the overall range of movement of the actuating element assembly.

The two sensors are configured so that the sensor I has a higher resolution in the range of the idle position. The output signals of the sensors I and II are supplied via the output lines 48 and 50, respectively, to the control unit 10. There they are supplied to an analog-to-digital converter 52 having an output line 54 connected to an actual-value forming unit 56.

The unit 56 has a first output line 58 which connects the unit 56 to the analog-to-digital converter 52; whereas, the second output line 60 leads from the unit 56 to the controller 32 and transmits the actual value of the position of the actuating element which was determined in the unit 56.

The blocks 28, 32, 52, 56 as well as block 62 mentioned further ahead are preferably part of a computer unit.

The open-loop and closed-loop control arrangement 10 can, in addition to the electronic engine power control system shown in FIG. 1, also contain arrangements known to the person of ordinary skill in the art for determining the ignition time point and the fuel quantity to be injected.

The measuring arrangement 46 is equipped with two potentiometers having respectively different lengths and resolutions according to U.S. Pat. No. 4,718,272, incorporated herein by reference, in accordance with a first embodiment of the invention.

Preferably, the two sensors I and II are sensors which operate on the basis of a different technical principle. For example, the high-resolving sensor I can be a conventional electric potentiometer while the sensor II which detects the entire range can be an absolute angle transducer which detects the position of the actuating element assembly in a contactless manner. Such a component is described for example as an inductive sensor in U.S. patent application Ser. No. 700,295, filed Feb. 11, 1985 and incorporated herein by reference. By appropriate construction of the sensors and their integration into the actuating element assembly, the sensor I detects the position of the actuating element only in the range of its idle position while the contactless operating sensor passes over the entire range.

However, for example also sensors operating on an optical, capacitive basis or eddy current principle can be advantageous.

The different resolution is obtained in that the overall measuring range of sensor I is only assigned to a part of the movement range of the element connected thereto; whereas, the measuring range of sensor II detects the entire range of movement of the element connected thereto. Accordingly, sensor I has a smalier excursion with respect to the element.

In this way, the desired resolution of an angular degree of 0.01 in the idle range and an angular degree of 0.1 outside of the idle range can be obtained in a simple manner.

The operation of the system shown in FIG. 1 will now be explained.

The desired-value forming unit 28 determines a desired value for the position of the actuating element or of the power-determining element 44. This desired value is determined from the measuring signals supplied via the lines 18 and 24 to 26 after they have been analog-to-digitally converted in accordance with pregiven characteristics or characteristic fields. The measurement signals supplied represent values for the position of the accelerator pedal or for operating variables of the engine and/or of the motor vehicle such as engine speed, engine temperature, battery voltage, operating condition signals from ancillary apparatus, drive slip control intervention and/or engine drag control intervention, road speed, gear position, et cetera.

During vehicle operation, the position of the power-determining element 44 is controlled by the controller 32 by means of a comparison of the desired position present on line 30 and the actual position of the actuating element 44 supplied via the line 60. This control of the power-determining element 44 is achieved in that a control signal is formed in dependence upon the difference of the actual and desired positions and formed according to a pregiven control algorithm. This control signal is then supplied via the output lines 34 and 38 to the electrically actuable actuating element 40 after a digital-to-analog conversion with this control signal acting in the sense of reducing the above-mentioned difference. In the idle operating condition of the engine, the desired value is pregiven in dependence upon the operating variables supplied via the lines 24 to 26 with a view to the control of the idle engine speed of the engine. The desired value supplied on line 30 corresponds to a desired position of the actuating element 40 viewed with respect to a desired engine speed which, in accordance with the above description, is compared with the actual value and generates a corresponding output signal.

Figure 2:
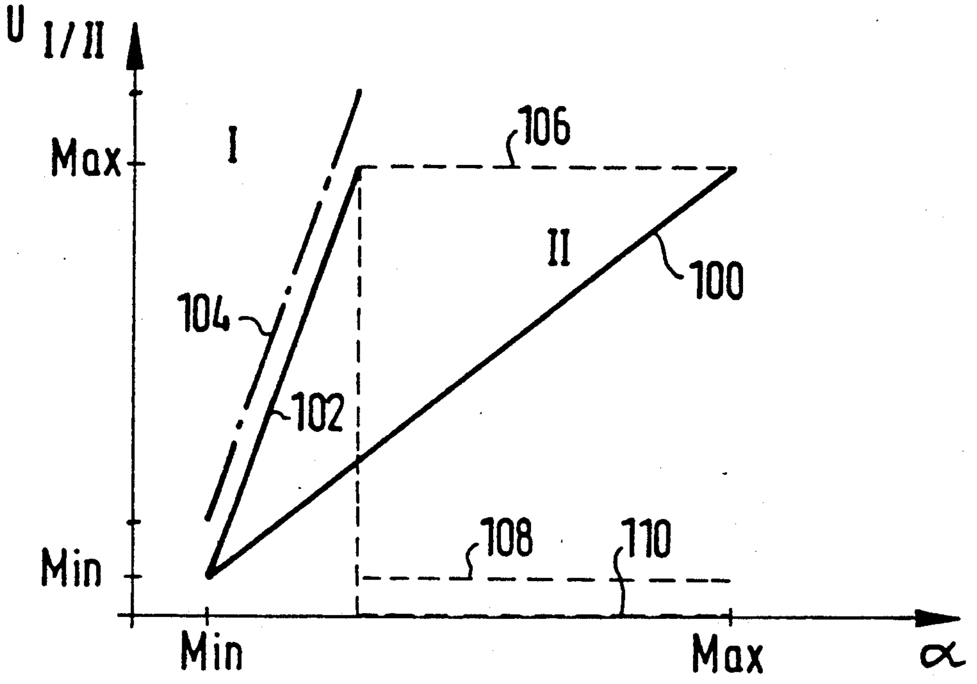
FIG. 2 shows the linear characteristics of two sensors utilized in the measuring arrangement of the control system shown in FIG. 1.

It is noted that according to the embodiment of FIG. 1, the actual-value measuring arrangement comprises two sensors of different resolution. The characteristics of these two sensors are shown in FIG. 2 as exemplary. FIG. 2 shows a diagram wherein the position $\alpha$ of the actuating element appears along the horizontal axis whereas the vertical axis carries a scale for the measurement signal values $U_I$, $U_{II}$ of the sensors I and II, respectively.

The actuating element 40 or the power-determining element 44 is controllable in a range of movement from a minimum value (Min) to a maximum value (Max). In dependence upon the position of the actuating element, the sensor II generates a measurement signal according to the line 100 which corresponds to a value range between a minimum signal value (Min) and a maximum signal value (Max) with preferably the minimum value being present when the actuating element is in its minimum position and the maximum value of the measurement signal being present when the actuating element is in its maximum position.

In contrast to sensor II, the sensor I passes over only a part of the range of movement of the actuating element and preferably a pregiven range about the idle position, that is, a position of the actuating element near the idle position. The sensor I emits measurement signals which exhibit a value in the range between a minimum value and a maximum value. This is clearly shown in FIG. 2 with the straight line 102 and with the straight line 104. The minimum and maximum values of the sensors I and II are preferably identical (see lines 100 and 102). However, advantageous embodiments are conceivable wherein the minimum and maximum values of the two sensors depart from each other (see straight lines 100 and 104).

Outside of the measuring range of sensor I, this sensor, in dependence upon its configuration, applies for example its maximum value 106, its minimum value 108 or the value zero over the entire additional range of the position of the actuating element as symbolized by the broken lines in FIG. 2.

By means of the different slope with the same value range of the measuring signal, there results for sensor I (straight line 102/104) a higher resolution than for the sensor II (straight line 100).

In addition to the linear characteristics of the sensors I and II shown in FIG. 2, other characteristics are also conceivable in an advantageous manner which have different slopes in different position ranges and so cause the resolution of the position signal of a sensor to be of different magnitude over the value range of this sensor. Furthermore, it can be advantageous to assign the maximum value of the measurement signal to the minimum value of the actuating element position.

If the actuating element is in the range of its idle position, then the corresponding measurement signal values of sensors I and II are supplied to the analog-to-digital converter 52 of the control arrangement 10 via respective lines 48 and 50. The converter 52 is controlled by the unit 56 for example by a switchover unit which is actuated at pregiven time points via the output line 58 of unit 56. The converter 52 sequentially converts the measurement signal of the sensor I and the measurement signal of the sensor II into corresponding digital values and supplies these values via the output lines 54 to the actual-value forming unit 56 for forming the actual value of the position of the actuating element.

Figure 3:
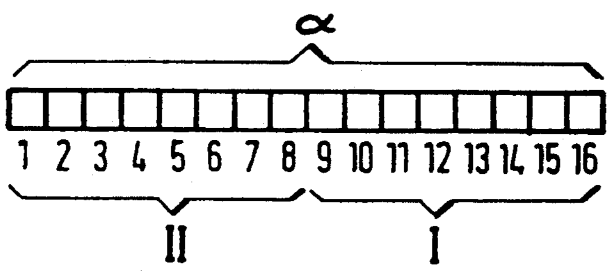
FIG. 3 is a schematic representation of the formation of the digital value representing the position of the actuator element.

The principle of formation of the digital actual value is made clear in FIG. 3. The digitally converted measurement values of the sensors I and II are scaled in unit 56 and interpolated with the minimum value being assigned the value 0 and the maximum value being assigned the predetermined limit value corresponding to the available positions of the analog-to-digital converter or to a part of these positions. Furthermore, the unit 56 forms the actual value of the position of the actuating element in such a manner that the higher order positions of the digital actual value are formed by the sensor II of low resolution whereas the low order digital positions are occupied in accordance with the measured values of the sensor I of high resolution.

In FIG. 3, a 16-position word for the position of the actuating element 40 is shown with the higher order eight binary positions in one embodiment being formed from the measurement value of sensor II and the low order eight binary positions being formed from the measurement value of sensor I.

The actual value formed in this manner of the position of the actuating element is supplied from the unit 56 via the connecting line 60 to the controller 32 which, in correspondence to a pregiven control algorithm, influences the position of the actuating element in the sense of a control of the actual value to the desired value.

A further advantageous embodiment of the system of FIG. 1 is provided in the safety monitor illustrated as block 62. The measured values of the sensors I and II are supplied to this safety monitor via the lines 66 and 64, respectively, which are connected to the lines 48 and 50, respectively; or, in the alternative, via the broken line 68 which is connected to line 54. The safety monitor 62 compares the measured values or measured signals of the two sensors I and II with respect to plausibility. With a departure, that is when, for example, the signal value of sensor I indicates a position of the element in the range of its idle position and the signal value of the sensor II represents a position outside of the idle position range, then an error in the area of the actuating element assembly is detected and an emergency vehicle operation or a shutoff of the electronic engine power control system is initiated via the output line 70 of the safety monitor 62.

Furthermore, the engine speed signal can be applied to the safety monitor and can also be considered when making the plausibility check. In this way, a triple redundancy is provided at least in the idle range.

Similar measures are applicable also to the measuring unit 16 of the accelerator pedal in an advantageous manner with two sensors of different resolution also being utilized there.

Figure 4:
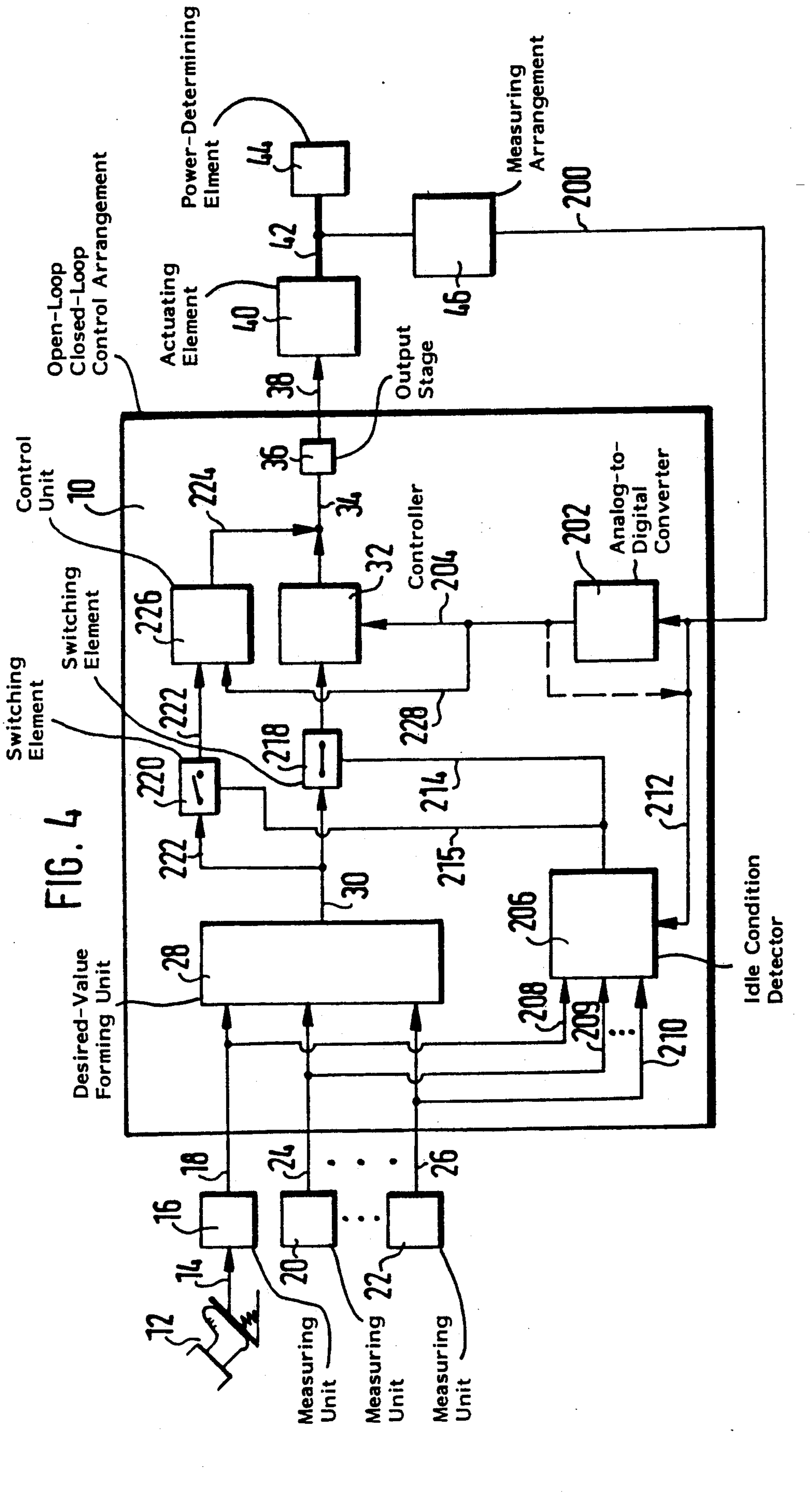
FIG. 4 is a second embodiment of the electronic engine power control system according to the invention; and, FIG. 5 shows the characteristic of the measuring arrangement utilized in the system of FIG. 4.

A further advantageous embodiment of the system according to the invention is shown in the block diagram of FIG. 4. Here, the elements already known from the description with respect to FIG. 1 are provided with the same reference numerals and are not further explained in the following.

In the embodiment of FIG. 4, a measuring arrangement 46 is provided for detecting the position of the actuating element 40 and of the power-determining element 44. The measuring arrangement 46 detects simply the position of the element in the range of the idle position of the actuating element. The measuring arrangement 46 is a transducer showing the absolute position such as a potentiometer or a contactless transducer operating on the optical, inductive, capacitive or electromagnetic principle. The position of the actuating element detected by the measuring arrangement 46 is transmitted via line 200 to the open-loop and closed-loop control unit 10. There, in an analog-to-digital converter 202, the analog position signal is converted to a digital measurement value which is supplied via the line 204 to the controller 32 for carrying out the control in the idle operating condition.

Furthermore, a block 206 is provided in this embodiment which detects the idle condition of the internal combustion engine. The following lines are connected to this block: a line 208 connecting the block 206 to the input line 18, connecting lines 209 and 210 connecting the block 206 to the input lines 24 to 26, respectively, and a line 212 connecting the block 206 to the lines 200 or 204. The output lines 214 or the line 215 branching from line 214 are connected to the switching elements 218 and 220 with the switching element 218 being arranged in the connecting line 30 or 34; whereas, the switching element 220 is arranged in a connecting line 222 branching from the connecting line 30 or, alternatively, in a connecting line 224 connected to the connecting line 34. The connecting line 222 connects the line 30 to a first input of control unit 226. The control unit 226 has a second input connected to line 228 which branches out from the line 204. The connecting line 224 is connected to the output of control unit 226.

The idle operating condition of the engine is determined by block 206 on the basis of its input signals, for example: the accelerator pedal or actuating element disposed in its idle position, when the gear shift is not in a particular gear, from the vehicle speed which is less than a minimum value and/or when the engine speed is in a pregiven range. In this idle operating condition, the switching unit 218 is closed and the switching unit 220 is open. In this way, the above-described control of the power-determining actuating element is carried out in the sense of an idle speed control. The control unit 226 is ineffective in this operating condition by means of the switching unit 220.

The switching units 218 and 220 can in an advantageous embodiment be realized by switch-on and switch-off inputs of the units 32 and 226.

Outside of the idle condition, block 206 controls the switching units in such a manner that the switching unit 218 is open and the switching unit 220 is closed. In this operating condition, the control of the position of the power-determining element is ineffective and the actuating element is adjusted in a controlled manner. This takes place by means of a control unit 226 which, in the form of a control program, generates an output signal dependent upon the preset value formed especially from the position of the operator-controlled element 12 and supplied via line 30 or 222. The output signal determines the position of the actuating element via the output stage 36 and the line 38 so that the actuating element assumes a position pregiven for the corresponding preset value.

In addition, the actual value of the position of the actuating element at idle is supplied to the control unit 226. This serves to balance the control program of the control unit 226 in order to avoid positioning errors of the control. In a pregiven position, for a specific preset value, the control program is balanced in such a manner that a predetermined start signal value is generated.

Figure 5:
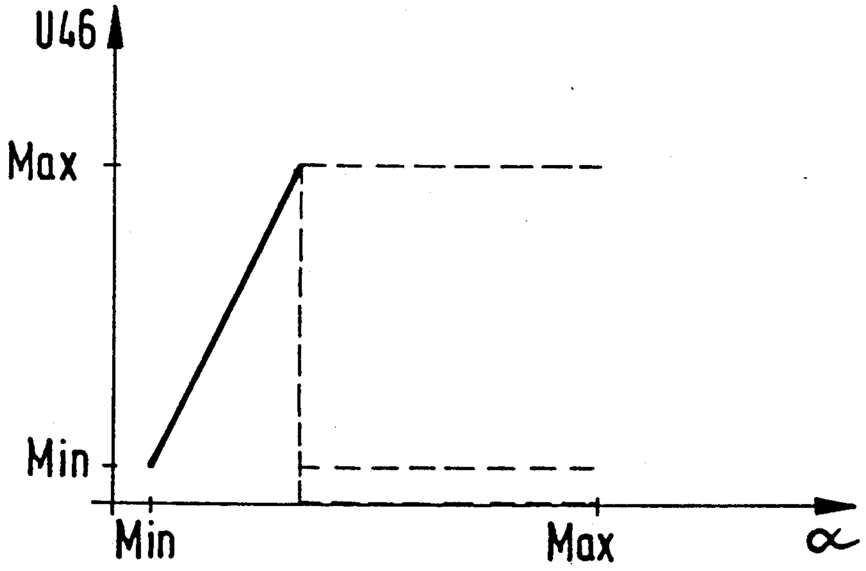

FIG. 5 shows the characteristic of the measuring arrangement 46 which is provided in a manner corresponding to FIG. 2.

The approach described above affords the advantage that the analog-to-digital converter 202 can be selected with a low resolution since the measurement signal to be converted is only needed in the idle range or in the range near idle of the actuating element position. The electronic engine power control system can therefore be driven with conventional electronic components. Furthermore, a digital control is possible in the idle range.

A use of a step motor of a known type in combination with the conventional procedures for fine positioning of a step motor as is known, for example, from the paper entitled "Methoden der Feinpositionierung von Schrittmotoren in Bereich eines Schritts" referred to above provides adequate precision in the adjustment of the actuating element.

Safety monitoring can be carried out advantageously via a plausibility comparison of the position signal value to the signals determining the idle condition.

It is understood that the foregoing description is that of the preferred embodiments of the invention and that various changes and modifications may be made thereto without departing from the spirit and scope of the invention as defined in the appended claims.

What is claimed is:

1. An electronic engine power control system for a motor vehicle, the system comprising:

an open-loop and closed-loop control arrangement;

an electrically actuable actuating element movable within a pregiven first range for influencing the power developed by the engine;

first measuring means connected to said actuating element for providing a signal indicative of the position of said actuating element;

an operator-controlled element operable by a driver of the vehicle and movable within a pregiven second range;

second measuring means connected to said operator-controlled element for providing a signal indicative of the position of said operator-controlled element;

at least one of said measuring means being configured to apportion the range corresponding thereto into a first measuring range corresponding to positions of said element which are at or near idle wherein said measuring means emits a first signal of first resolution indicative of the position of the element within said first measuring range and a second measuring range wherein said measuring means emits a second signal of a second resolution indicative of the position of the element within said second measuring range with said first resolution being greater than said second resolution;

said control arrangement including:

a desired-value forming unit for providing a pregiven desired-value signal indicative of the desired value of the position of said actuating element;

said desired-value forming unit being connected to said second measuring means for receiving said signal indicative of the position of said operator-controlled element;

a controller for comparing said desired-value signal to said first signal for controlling said actuating element to a position corresponding to the position represented by said desired-value signal; and, said controller being adapted to adjust the position of said actuating element outside of the idle condition of the engine at least in dependence upon a pregiven value derived from the position of the operator-controlled element.

2. The electronic engine power control system of claim 1, wherein said controller is adapted to determine the position of said actuating element outside of the idle condition of the engine in dependence upon said second signal and said desired-value signal wherein said first measuring range corresponds to positions of the actuating element indicative of the idle and near idle conditions of the engine.

3. The electronic engine power control system of claim 1, said one measuring means including a first sensor for detecting the position of said element within said first measuring range with said first resolution; and, a second sensor for detecting the position of said element over the entire range of movement of said element with said second resolution.

4. The electronic engine power control system of claim 3, wherein said first and second signals are signals of said first and second sensors, respectively, with said signals conjointly defining a data word with said first sensor determining the low-order positions of said data word and said second sensor determining the higher order positions of said data word.

5. The electronic engine power control system of claim 1, said control arrangement further including means for comparing said first and second measuring signals with respect to plausibility to detect a malfunction of the engine and/or motor vehicle.

6. The electronic engine power control system of claim 1, wherein the engine speed is utilized to perform a malfunction check.

7. The electronic engine power control system of claim 1, wherein said operator-controlled element supplies a preset value and said control arrangement includes control means for adjustably controlling said actuating element in dependence upon said preset value outside of said first measuring range and wherein said one measuring means does not detect the position of said actuating element outside of said first measuring range.

8. The electronic engine power control system of claim 7, wherein said actuating element includes a step motor.

* * * * *